US012705735B1

(12) United States Patent
Diao et al.

(10) Patent No.: US 12,705,735 B1
(45) Date of Patent: Aug. 11, 2026

(54) METHODS, SYSTEMS, AND COMPUTER PROGRAM PRODUCTS FOR PROCESSING A PERIODONTAL CHART TO STORE THE INFORMATION ITEMS THEREIN IN A CONSTRUCT THAT PRESERVES THE RELATIONSHIPS BETWEEN THE INFORMATION ITEMS

(71) Applicant: Optum, Inc., Minnetonka, MN (US)

(72) Inventors: Qian Diao, San Jose, CA (US); Prativa Behera, Franklin, TN (US); Lettie Murr, Charlotte, NC (US); Pratheep Palaniswamy, Brentwood, TN (US); Feili Yu, Shoreline, WA (US)

(73) Assignee: Optum, Inc., Minnetonka, MN (US)

(*) Notice: Subject to any disclaimer, the term of this patent is extended or adjusted under 35 U.S.C. 154(b) by 495 days.

(21) Appl. No.: 18/185,595

(22) Filed: Mar. 17, 2023

(51) Int. Cl.
*G06V 10/25* (2022.01)
*G06T 7/00* (2017.01)
*G06T 7/73* (2017.01)
*G06V 30/19* (2022.01)

(52) U.S. Cl.
CPC .............. *G06T 7/0012* (2013.01); *G06T 7/74* (2017.01); *G06V 10/25* (2022.01); *G06V 30/19* (2022.01); *G06T 2207/30036* (2013.01)

(58) Field of Classification Search
CPC ....... G06T 7/00; G06T 7/0006; G06T 7/0012; G06T 2207/30036; G06V 10/25; G06V 30/19; G06V 30/19007; G06V 30/19013; G06V 10/70; G06V 10/72; G06V 2201/03; G06V 40/00
See application file for complete search history.

(56) References Cited

U.S. PATENT DOCUMENTS

| | | | | |
|---|---|---|---|---|
| 2010/0121658 | A1* | 5/2010 | Kaminski | A61C 19/00 715/790 |
| 2012/0179492 | A1* | 7/2012 | Rhodes | G16H 10/60 705/3 |
| 2014/0324919 | A1* | 10/2014 | Badawi | G06F 30/20 707/803 |
| 2019/0244693 | A1* | 8/2019 | Haws | A61B 5/7435 |
| 2020/0302004 | A1* | 9/2020 | Spencer | G06N 5/046 |
| 2021/0338387 | A1* | 11/2021 | Inam | G06T 7/0012 |
| 2022/0180447 | A1* | 6/2022 | Kearney | G06N 3/045 |

* cited by examiner

*Primary Examiner* — Oneal R Mistry
*Assistant Examiner* — Duy Tran
(74) *Attorney, Agent, or Firm* — MARSHALL, GERSTEIN & BORUN LLP

(57) ABSTRACT

A method includes receiving a periodontal chart image; processing the periodontal chart image using optical character recognition to obtain pocket measurements associated with a plurality of teeth along with positional coordinates of each of the pocket measurements; applying layout rules associated with the periodontal chart image to identify which respective ones of the pocket measurements correspond to which respective ones of the plurality of teeth; and storing the pocket measurements in a computer-readable construct having a specified data format that preserves relationships between the respective ones of the pocket measurements and the respective one of the plurality of teeth.

20 Claims, 7 Drawing Sheets

METHODS, SYSTEMS, AND COMPUTER PROGRAM PRODUCTS FOR PROCESSING A PERIODONTAL CHART TO STORE THE INFORMATION ITEMS THEREIN IN A CONSTRUCT THAT PRESERVES THE RELATIONSHIPS BETWEEN THE INFORMATION ITEMS

FIELD

The present inventive concepts relate generally to health care systems and services and, more particularly, to processing attachments to a dental claim for medical necessity adjudication.

BACKGROUND

A significant portion of dental procedures that are performed require one or more attachments to accompany a claim that is submitted to a dental care payment plan administrator, e.g., a private insurance entity, government insurance entity, and/or a medical expense sharing organization, which may be referred to as a "payor," for payment. The one or more attachments are intended to provide evidentiary support of the medical necessity for the procedures for which reimbursement is sought. These procedures account for a relatively large portion of the total amount of payor reimbursements. One type of attachment is known as a periodontal chart (PC). A periodontal chart includes measurements of pocket depth, which is the space between the tooth and the surrounding gum tissue. Dental providers use these measurements to keep a record of tooth and gum tissue health by tracking changes in the depths over time to see if treatment is required. Periodontal charts are one of the most common dental claim attachments that are submitted to payors for reimbursement. Based on the records in a periodontal chart and potentially other attachments to a claim, a payor typically performs a manual adjudication process to reject or approve the claim for payment.

SUMMARY

According to some embodiments of the inventive concept, a method comprises: receiving a periodontal chart image; processing the periodontal chart image using optical character recognition to obtain pocket measurements associated with a plurality of teeth along with positional coordinates of each of the pocket measurements; applying layout rules associated with the periodontal chart image to identify which respective ones of the pocket measurements correspond to which respective ones of the plurality of teeth; and storing the pocket measurements in a computer-readable construct having a specified data format that preserves relationships between the respective ones of the pocket measurements and the respective one of the plurality of teeth.

In other embodiments, the method further comprises: applying layout rules associated with the periodontal chart image to associate one or more measurement names with the pocket measurements; applying layout rules associated with the periodontal chart image to associate one or more measurement dates with the pocket measurements; and applying layout rules associated with the periodontal chart image to identify a tooth location for each of the pocket measurements; wherein storing the pocket measurements comprises: storing the pocket measurements in a computer-readable construct having the specified data format that preserves the relationships between the respective ones of the pocket measurements and the respective one of the plurality of teeth, that preserves relationships between the one or more measurement names and the pocket measurements, that preserves relationships between the one or more measurement dates and the pocket measurements, and that preserves relationships between the tooth locations and the pocket measurements.

In still other embodiments, the tooth location is facial, lingual, or buccal.

In still other embodiments, the layout rules specify that row coordinates are used to differentiate the pocket measurements for different ones of the plurality of teeth; the layout rules specify that the one or more measurement names have similar column coordinates; the layout rules specify that the one or more measurement dates have similar column coordinates; and the layout rules specify that ones of the pocket measurements corresponding to a same one of the plurality of teeth have similar column coordinates.

In still other embodiments, the layout rules specify that ones of the pocket measurements corresponding to teeth 1-16 in the facial location are in a first quarter section of the periodontal chart image as defined by column coordinates; the layout rules specify that ones of the pocket measurements corresponding to teeth 1-16 in the lingual location are in a second quarter section of the periodontal chart image as defined by column coordinates; the layout rules specify that ones of the pocket measurements corresponding to teeth 32-17 in the lingual location are in a third quarter section of the periodontal chart image as defined by column coordinates; and the layout rules specify that ones of the pocket measurements corresponding to teeth 32-17 in the facial location are in a fourth quarter section of the periodontal chart image as defined by column coordinates.

In still other embodiments, the method further comprises: enhancing the periodontal chart image prior to processing the periodontal chart image using optical character recognition.

In still other embodiments, enhancing the periodontal chart image comprises: removing extraneous information from the periodontal chart image; normalizing the background of the periodontal chart image; changing one or more font colors used in the periodontal chart image; or changing one or more font sizes used in the periodontal chart image.

In still other embodiments, the method further comprises: identifying column boundaries in the periodontal chart image, each of the columns in the periodontal chart image being associated with a unique pair of the plurality of teeth; wherein identifying the column boundaries in the periodontal chart image comprises: identifying the column boundaries in the periodontal chart image using image segmentation when the periodontal chart image includes column separator indicia; and deriving the column boundaries using optical character recognition coordinates when the periodontal chart images does not include column separator indicia.

In still other embodiments, the computer-readable construct having the specified data format is a JavaScript Object Notation (JSON) string.

In some embodiments of the inventive concept, a system comprises: a processor; and a memory coupled to the processor and comprising computer readable program code embodied in the memory that is executable by the processor to perform operations comprising: receiving a periodontal chart image; processing the periodontal chart image using optical character recognition to obtain pocket measurements associated with a plurality of teeth along with positional coordinates of each of the pocket measurements; applying layout rules associated with the periodontal chart image to identify which respective ones of the pocket measurements correspond to which respective ones of the plurality of teeth; and storing the pocket measurements in a computer-readable construct having a specified data format that preserves relationships between the respective ones of the pocket measurements and the respective one of the plurality of teeth.

In further embodiments, the operations further comprise: applying layout rules associated with the periodontal chart image to associate one or more measurement names with the pocket measurements; applying layout rules associated with the periodontal chart image to associate one or more measurement dates with the pocket measurements; and applying layout rules associated with the periodontal chart image to identify a tooth location for each of the pocket measurements; wherein storing the pocket measurements comprises: storing the pocket measurements in a computer-readable construct having the specified data format that preserves the relationships between the respective ones of the pocket measurements and the respective one of the plurality of teeth, that preserves relationships between the one or more measurement names and the pocket measurements, that preserves relationships between the one or more measurement dates and the pocket measurements, and that preserves relationships between the tooth locations and the pocket measurements; and wherein the tooth location is facial, lingual, or buccal.

In still further embodiments, the layout rules specify that row coordinates are used to differentiate the pocket measurements for different ones of the plurality of teeth; the layout rules specify that the one or more measurement names have similar column coordinates; the layout rules specify that the one or more measurement dates have similar column coordinates; and the layout rules specify that ones of the pocket measurements corresponding to a same one of the plurality of teeth have similar column coordinates.

In still further embodiments, the layout rules specify that ones of the pocket measurements corresponding to teeth 1-16 in the facial location are in a first quarter section of the periodontal chart image as defined by column coordinates; the layout rules specify that ones of the pocket measurements corresponding to teeth 1-16 in the lingual location are in a second quarter section of the periodontal chart image as defined by column coordinates; the layout rules specify that ones of the pocket measurements corresponding to teeth 32-17 in the lingual location are in a third quarter section of the periodontal chart image as defined by column coordinates; and the layout rules specify that ones of the pocket measurements corresponding to teeth 32-17 in the facial location are in a fourth quarter section of the periodontal chart image as defined by column coordinates.

In still further embodiments, the operations further comprise: enhancing the periodontal chart image prior to processing the periodontal chart image using optical character recognition; wherein enhancing the periodontal chart image comprises: removing extraneous information from the periodontal chart image; normalizing the background of the periodontal chart image; changing one or more font colors used in the periodontal chart image; or changing one or more font sizes used in the periodontal chart image.

In still further embodiments, the operations further comprise: identifying column boundaries in the periodontal chart image, each of the columns in the periodontal chart image being associated with a unique pair of the plurality of teeth; wherein identifying the column boundaries in the periodontal chart image comprises: identifying the column boundaries in the periodontal chart image using image segmentation when the periodontal chart image includes column separator indicia; and deriving the column boundaries using optical character recognition coordinates when the periodontal chart images does not include column separator indicia.

In some embodiments of the inventive concept, a computer program product comprises: a non-transitory computer readable storage medium comprising computer readable program code embodied in the medium that is executable by a processor to perform operations comprising: receiving a periodontal chart image; processing the periodontal chart image using optical character recognition to obtain pocket measurements associated with a plurality of teeth along with positional coordinates of each of the pocket measurements; applying layout rules associated with the periodontal chart image to identify which respective ones of the pocket measurements correspond to which respective ones of the plurality of teeth; and storing the pocket measurements in a computer-readable construct having a specified data format that preserves relationships between the respective ones of the pocket measurements and the respective one of the plurality of teeth.

In other embodiments, the operations further comprise: applying layout rules associated with the periodontal chart image to associate one or more measurement names with the pocket measurements; applying layout rules associated with the periodontal chart image to associate one or more measurement dates with the pocket measurements; and applying layout rules associated with the periodontal chart image to identify a tooth location for each of the pocket measurements; wherein storing the pocket measurements comprises: storing the pocket measurements in a computer-readable construct having the specified data format that preserves the relationships between the respective ones of the pocket measurements and the respective one of the plurality of teeth, that preserves relationships between the one or more measurement names and the pocket measurements, that preserves relationships between the one or more measurement dates and the pocket measurements, and that preserves relationships between the tooth locations and the pocket measurements; and wherein the tooth location is facial, lingual, or buccal.

In still other embodiments, the layout rules specify that row coordinates are used to differentiate the pocket measurements for different ones of the plurality of teeth; the layout rules specify that the one or more measurement names have similar column coordinates; the layout rules specify that the one or more measurement dates have similar column coordinates; the layout rules specify that ones of the pocket measurements corresponding to a same one of the plurality of teeth have similar column coordinates; the layout rules specify that ones of the pocket measurements corresponding to teeth 1-16 in the facial location are in a first quarter section of the periodontal chart image as defined by column coordinates; the layout rules specify that ones of the pocket measurements corresponding to teeth 1-16 in the lingual location are in a second quarter section of the periodontal chart image as defined by column coordinates; the layout rules specify that ones of the pocket measurements corresponding to teeth 32-17 in the lingual location are in a third quarter section of the periodontal chart image as defined by column coordinates; and the layout rules specify that ones of the pocket measurements corresponding to teeth 32-17 in the facial location are in a fourth quarter section of the periodontal chart image as defined by column coordinates.

In still other embodiments, the operations further comprise: enhancing the periodontal chart image prior to processing the periodontal chart image using optical character recognition; wherein enhancing the periodontal chart image comprises: removing extraneous information from the periodontal chart image; normalizing the background of the periodontal chart image; changing one or more font colors used in the periodontal chart image; or changing one or more font sizes used in the periodontal chart image.

In still other embodiments, the operations further comprise: identifying column boundaries in the periodontal chart image, each of the columns in the periodontal chart image being associated with a unique pair of the plurality of teeth; wherein identifying the column boundaries in the periodontal chart image comprises: identifying the column boundaries in the periodontal chart image using image segmentation when the periodontal chart image includes column separator indicia; and deriving the column boundaries using optical character recognition coordinates when the periodontal chart images does not include column separator indicia.

Other methods, systems, articles of manufacture, and/or computer program products according to embodiments of the inventive concept will be or become apparent to one with skill in the art upon review of the following drawings and detailed description. It is intended that all such additional systems, methods, articles of manufacture, and/or computer program products be included within this description, be within the scope of the present inventive subject matter and be protected by the accompanying claims.

BRIEF DESCRIPTION OF THE DRAWINGS

Other features of embodiments will be more readily understood from the following detailed description of specific embodiments thereof when read in conjunction with the accompanying drawings, in which.

DETAILED DESCRIPTION

Figure 1:
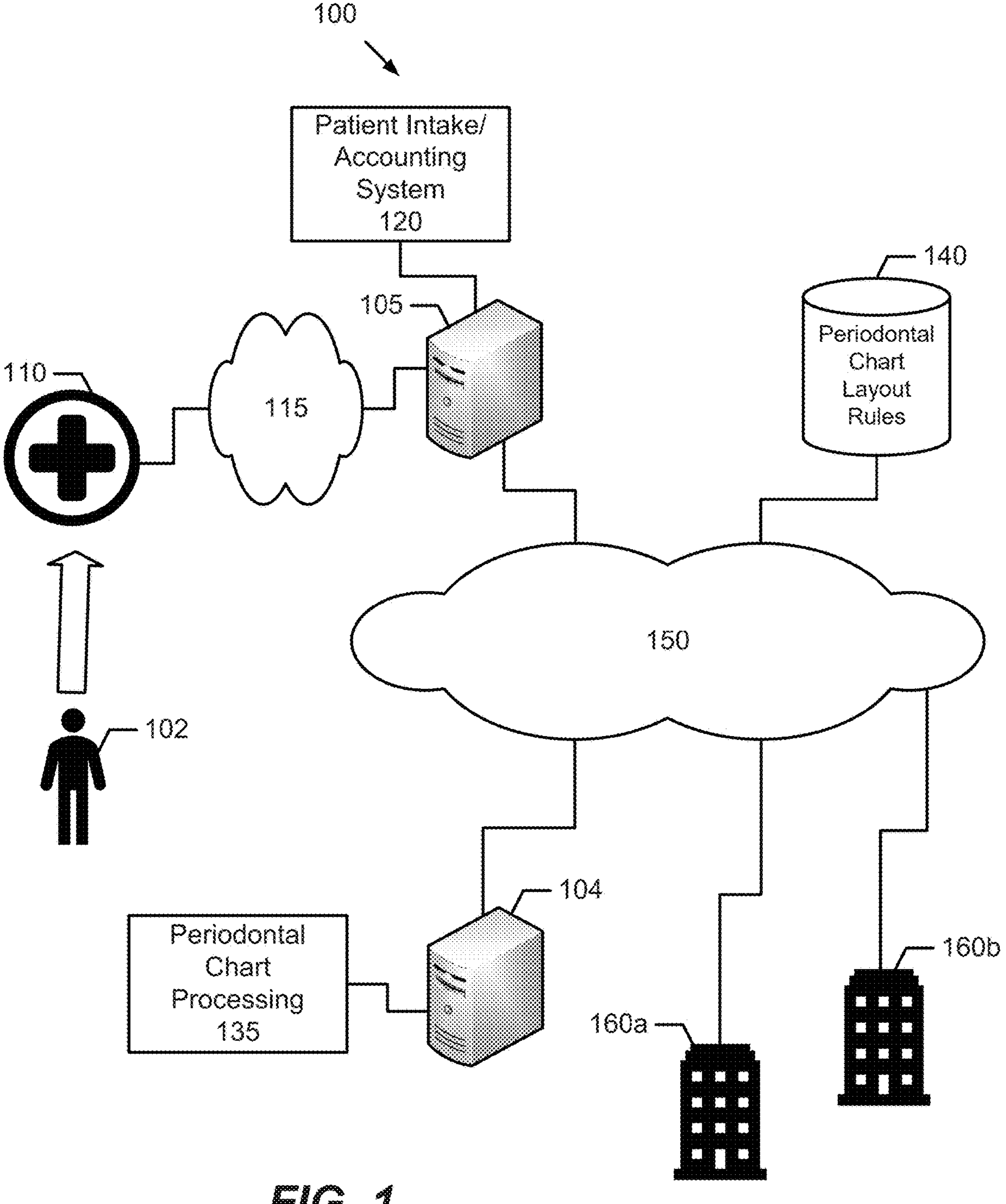
FIG. 1 is a block diagram that illustrates a communication network including a periodontal chart processing system in accordance with some embodiments of the inventive concept.

In the following detailed description, numerous specific details are set forth to provide a thorough understanding of embodiments of the inventive concept. However, it will be understood by those skilled in the art that embodiments of the inventive concept may be practiced without these specific details. In some instances, well-known methods, procedures, components, and circuits have not been described in detail so as not to obscure the inventive concept. It is intended that all embodiments disclosed herein can be implemented separately or combined in any way and/or combination. Aspects described with respect to one embodiment may be incorporated in different embodiments although not specifically described relative thereto. That is, all embodiments and/or features of any embodiments can be combined in any way and/or combination.

As used herein, the term "provider" may mean any person or entity involved in providing health care products and/or services to a patient.

As used herein, a "service" includes, but is not limited to, a software and/or hardware service, such as cloud services in which software, platforms, and infrastructure are provided remotely through, for example, the Internet. A service may be provided using Software as a Service (SaaS), Platform as a Service (PaaS), and/or Infrastructure as a Service (IaaS) delivery models. In the SaaS model, customers generally access software residing in the cloud using a thin client, such as a browser, for example. In the PaaS model, the customer typically creates and deploys the software in the cloud sometimes using tools, libraries, and routines provided through the cloud service provider. The cloud service provider may provide the network, servers, storage, and other tools used to host the customer's application(s). In the IaaS model, the cloud service provider provides physical and/or virtual machines along with hypervisor(s). The customer installs operating system images along with application software on the physical and/or virtual infrastructure provided by the cloud service provider.

As used herein, a "field" is the intersection of an "attribute" and a record. This may be illustrated by way of example: A database table may have multiple attributes, such as name, address, phone number, etc. Each record in the table has the data on one entity, such as a customer. The name of a specific customer will be stored in the field that is the intersection of the name attribute and the record for that specific customer.

Some embodiments of the inventive concept stem from a realization that periodontal charts are frequently attached to dental claims and submitted to payors for reimbursement. The periodontal charts are typically manually processed by adjudicators who need to find the corresponding tooth identified in the body of the claim, extract the pocket depth measurements from the periodontal chart for that tooth, and determine whether these measurements support, e.g., provide medical necessity evidence for, one or more procedures identified in the body of the claim. The periodontal chart, however, is often dense with information, and the information contained therein is often written with small fonts, which may make the payors adjudication process slow and error prone. Some embodiments of the inventive concept may provide a periodontal chart processing system that can extract the teeth and pocket measurement information contained therein and store this information in a computer-readable construct having a specified data format, such as a JavaScript Object Notation (JSON) string, that preserves the relationships between the pocket measurements and the teeth. Layout rules associated with the periodontal chart may identify which pocket measurements correspond to which teeth and may also identify the locations of measurement names, measurement dates, and teeth locations within the periodontal chart. As the periodontal chart information is converted into a construct that can be readily processed using a computer, the amount of manual review of the periodontal chart information during claim adjudication by a payor may be reduced.

Referring to FIG. 1, a communication network 100 including a periodontal chart processing system, in accordance with some embodiments of the inventive concept, comprises one or more dental care provider facilities or practices 110 that treats one or more patients 102. Each health care provider facility or practice may represent various types of organizations that are used to deliver dental care services to patients via health care professionals, which are referred to generally herein as "providers." The providers may include, but are not limited to, dental practices, mobile dental care facilities, oral surgery centers, diagnostic centers, lab centers, pharmacies, and the like. The providers may operate by providing dental care services for patients and then invoicing one or more payors 160*a* and 160*b* for the services rendered. The payors 160*a* and 160*b* may include, but are not limited to, providers of private insurance plans, providers of government insurance plans (e.g., Medicare, Medicaid, state, or federal public employee insurance plans), providers of hybrid insurance plans (e.g., Affordable Care Act plans), providers of private medical cost sharing plans, and the patients themselves. One provider facility 110 is illustrated in FIG. 1 with the provider including a patient intake/accounting system server 105 accessible via a network 115. The patient intake/accounting system server 105 may be configured with a patient intake/accounting system module 120 to manage the intake of patients for appointments and to generate invoices for payors for services and products rendered through the provider 110. The network 115 communicatively couples the patient intake/accounting system server 105 to other devices, terminals, and systems in the provider's facility 110. The network 115 may comprise one or more local or wireless networks to communicate with patient intake/accounting system server 105 when the patient intake/accounting system server 105 is located in or proximate to the dental care service provider facility 110. When the patient intake/accounting system server 105 is in a remote location from the health care facility, such as part of a cloud computing system or at a central computing center, then the network 115 may include one or more wide area or global networks, such as the Internet.

Figure 5:
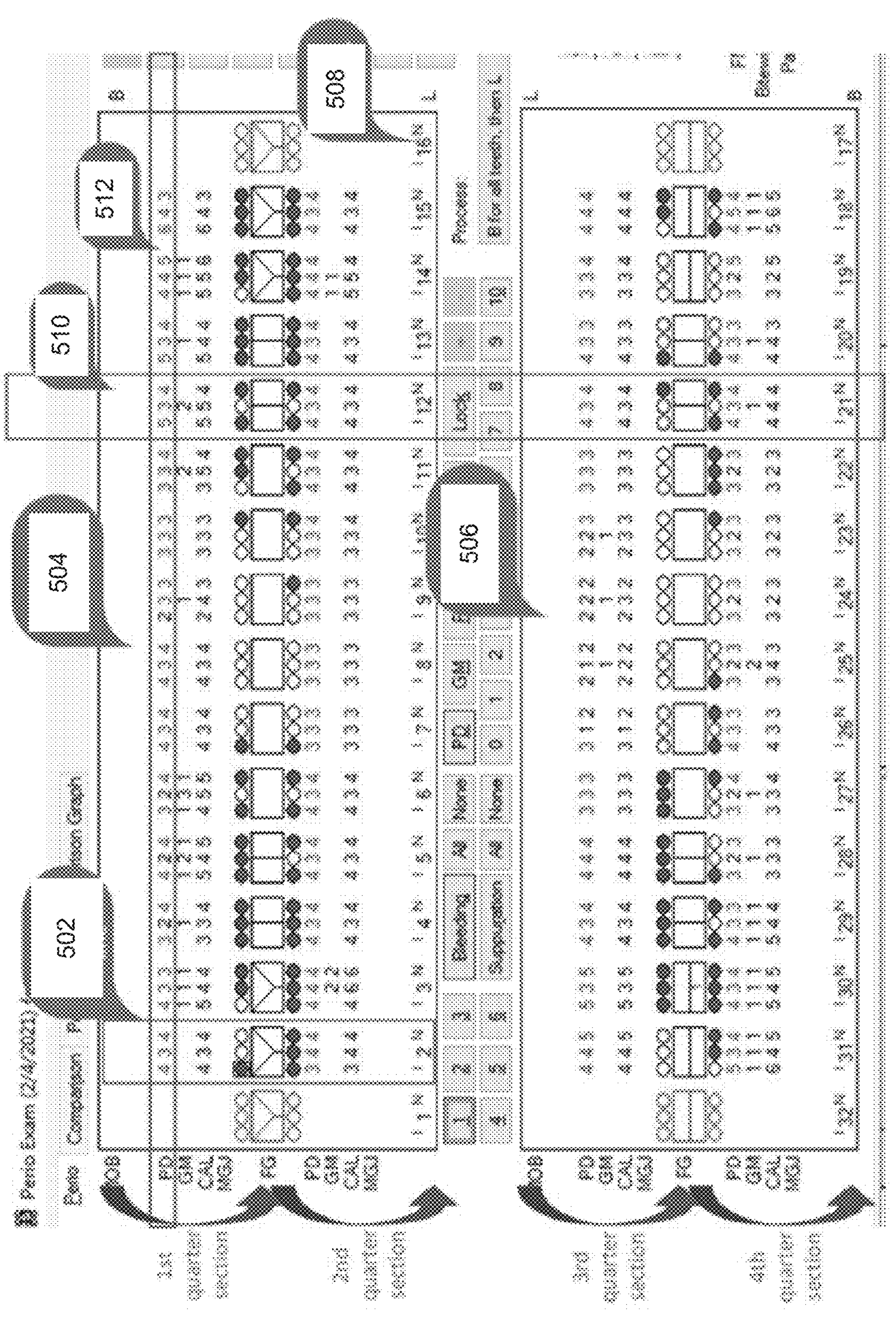
FIG. 5 is a diagram of a periodontal chart in accordance with some embodiments of the inventive concept.

According to some embodiments of the inventive concept, a periodontal chart processing server 104 may include a periodontal chart processing module 135 that is configured to provide a multi-module periodontal chart processing engine that is configured to extract teeth and pocket information from the periodontal chart and store this information in a computer-readable construct that has a specified data format that preserves the relationships between the teeth and pocket information and supplemental information, such as measurement date, measurement name, and the like. The periodontal chart processing engine is configured to use layout rules for a periodontal chart, which are stored in the periodontal chart layout rules repository 140, for interpreting the information contained in a periodontal chart so that the relationships between the information may be preserved. The periodontal chart layout rules may provide an algorithmic map of where information, such as tooth number, pocket measurement data, measurement name(s), measurement date(s), and tooth location, e.g., facial, lingual, and buccal, are located. Referring now to FIG. 5, a periodontal chart may be configured with an upper part 504 and a lower part 506 with the upper part including a first quarter section and a second quarter section and the lower part including a third quarter section and a fourth quarter section. The upper part 504 includes pocket depth measurement information for teeth 1-16 and the lower part 506 includes pocket depth measurement information for teeth 17-32. For example, tooth 16 508 is in the second quarter section of the upper part 504 of the periodontal chart. The periodontal chart may be organized in columns with each column being the same width and having a unique set of two teeth therein-one in the upper part of the chart 504 and one in the lower part of the chart 506. In some periodontal charts the columns may be defined by a column separator 502 while in other periodontal charts the columns 510 may be undefined. The column separators 502 may be used to identify the column boundaries in a periodontal chart image when present. When the periodontal chart does not include column separators 502, a column 510 boundary may be derived using optical character recognition coordinates. In the example of FIG. 5, the periodontal chart includes multiple measurement names PD, GM, CAL, and MGJ, which are organized by row 512 and may correspond to different measurement dates. In the example of FIG. 5, specific measurement dates are not identified. The pocket measurements for each side of each tooth are organized by row 512 with the location on the tooth being identified by a position within the column for the respective tooth.

Thus, in accordance with some embodiments of the inventive concept, the layout rules may specify that row coordinates are used to differentiate the pocket measurements for different ones of the plurality of teeth, that the one or more measurement names have similar column coordinates, that the one or more measurement dates have similar column coordinates, that the pocket measurements corresponding to a same tooth have similar column coordinates. Moreover, the layout rules may specify that the pocket measurements corresponding to teeth 1-16 in the facial location are in a first quarter section of the periodontal chart image as defined by column coordinates, that the pocket measurements corresponding to teeth 1-16 in the lingual location are in a second quarter section of the periodontal chart image as defined by column coordinates, that the pocket measurements corresponding to teeth 32-17 in the lingual location are in a third quarter section of the periodontal chart image as defined by column coordinates, and that the pocket measurements corresponding to teeth 32-17 in the facial location are in a fourth quarter section of the periodontal chart image as defined by column coordinates.

Returning to FIG. 1, a network 150 couples the patient intake/accounting system server 105 and payors 160*a*, 160*b* to the claim attachment assistant server 104. The network 150 may be a global network, such as the Internet or other publicly accessible network. Various elements of the network 150 may be interconnected by a wide area network, a local area network, an Intranet, and/or other private network, which may not be accessible by the general public. Thus, the communication network 150 may represent a combination of public and private networks or a virtual private network (VPN). The network 150 may be a wireless network, a wireline network, or may be a combination of both wireless and wireline networks.

The periodontal chart processing service provided through the periodontal chart processing server 104 and the periodontal chart layout rules 140 may, in some embodiments, be embodied as a cloud service. For example, payors 160*a*, 160*b* may access the periodontal chart processing service as a Web service for use when adjudicating claims received from providers, for example. In some embodiments, the periodontal chart processing service may be implemented as a Representational State Transfer Web Service (RESTful Web service).

Although FIG. 1 illustrates an example communication network including a periodontal chart processing engine that is configured to extract teeth and pocket information from the periodontal chart and store this information in a computer-readable construct that has a specified data format that preserves the relationships between the teeth and pocket information, it will be understood that embodiments of the inventive subject matter are not limited to such configurations, but are intended to encompass any configuration capable of carrying out the operations described herein.

Figure 2:
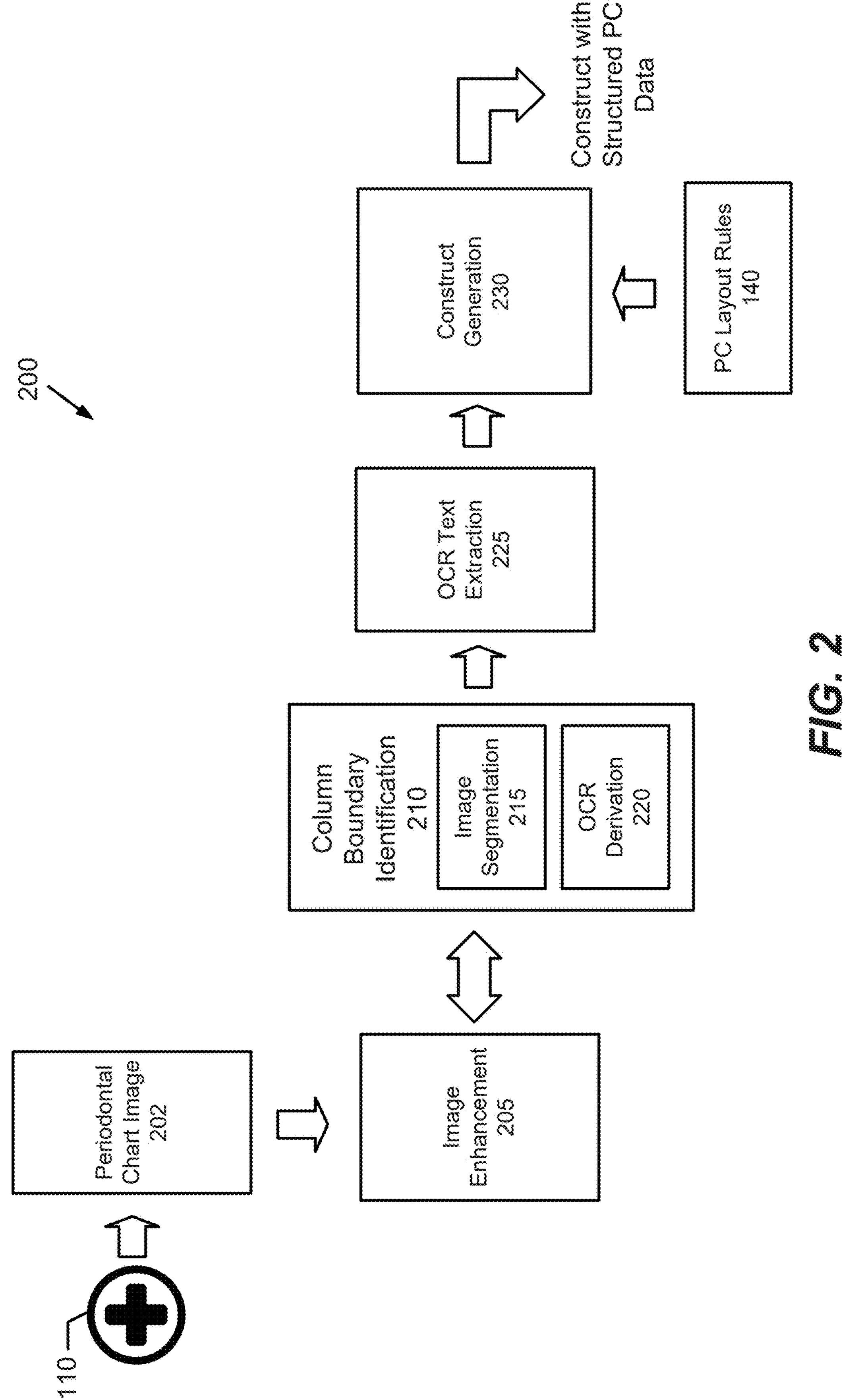
FIG. 2 is a block diagram that illustrates the periodontal chart processing system in accordance with some embodiments of the inventive concept.

FIG. 2 is a block diagram that illustrates the periodontal chart processing system in accordance with some embodiments of the inventive concept. As shown in FIG. 2, the periodontal chart processing system 200 includes a plurality of modules that are coupled in pipeline fashion. A periodontal chart image 202 may be communicated, for example, from a provider 110 to a payor as part of a claim attachment. The payor may use the periodontal chart processing system, for example, to assist in adjudicating the claim by extracting information from the periodontal chart image 202 so that it can be stored in a computer-readable construct for further processing and analysis. In some instances, the periodontal chart image 202 may be a relatively low-quality image, the font sizes may be small, and/or the resolution may be poor. The image enhancement module 205 may be configured to remove unnecessary or extraneous information from the periodontal chart image, to use image processing technologies to enhance the image by normalizing the background of the periodontal chart image, change one or more of the font colors used in the periodontal chart image (e.g., convert all fonts to black), and/or change one or more font sizes used in the periodontal chart image. The column boundary identification module 210 may receive the enhanced periodontal chart image output from the image enhancement module 205 and use optical character recognition (OCR) to identify the column boundaries in the periodontal chart image. When the periodontal chart image has discernable column separators (e.g., vertical lines), the image segmentation module 215 may identify the coordinates of the various columns before processing the periodontal chart using OCR. If the periodontal chart does not have column separators, then the OCR derivation module 220 may be configured to apply OCR to the periodontal chart to derive the locations of the various columns based on the positioning of text in the periodontal chart. The OCR text extraction module 225 may then process the periodontal chart to extract teeth, pocket measurement, measurement names, measurement dates, and tooth location (i.e., location on tooth—facial, lingual, or buccal) information from the periodontal chart. The extracted periodontal chart information output from the OCT text extraction module 225, however, no longer includes the relationships that tie the various items of information together. The construct generation module 230 may be configured to apply the periodontal chart layout rules 140, which were described above with respect to FIGS. 1 and 5, to generate a computer-readable construct having a specified data format that preserves the relationships between the various types of information extracted from the periodontal chart. In some embodiments, the computer-readable construct having the specified data format may be a JavaScript Object Notation (JSON) string. It will be understood that other types of constructs or data structures may be used in different embodiments of the inventive concept. As an example, a JSON string extracted from a periodontal chart that includes tooth number (tooth 2), location (facial or lingual), no measurement date, and measurement name (PD and CAL) may be constructed as follows: ‘2:{‘F’[‘PD:4,3,4’,‘CAL:4,3,4’], ‘L’:[PD:3,4,4’, ‘CAL:3,4,4’]}’. Such a JASON string may then be processed using a computer thereby automating the analysis of the periodontal chart, which may reduce the amount of manual review of the periodontal chart during, for example, claim adjudication by a payor.

Figure 3:
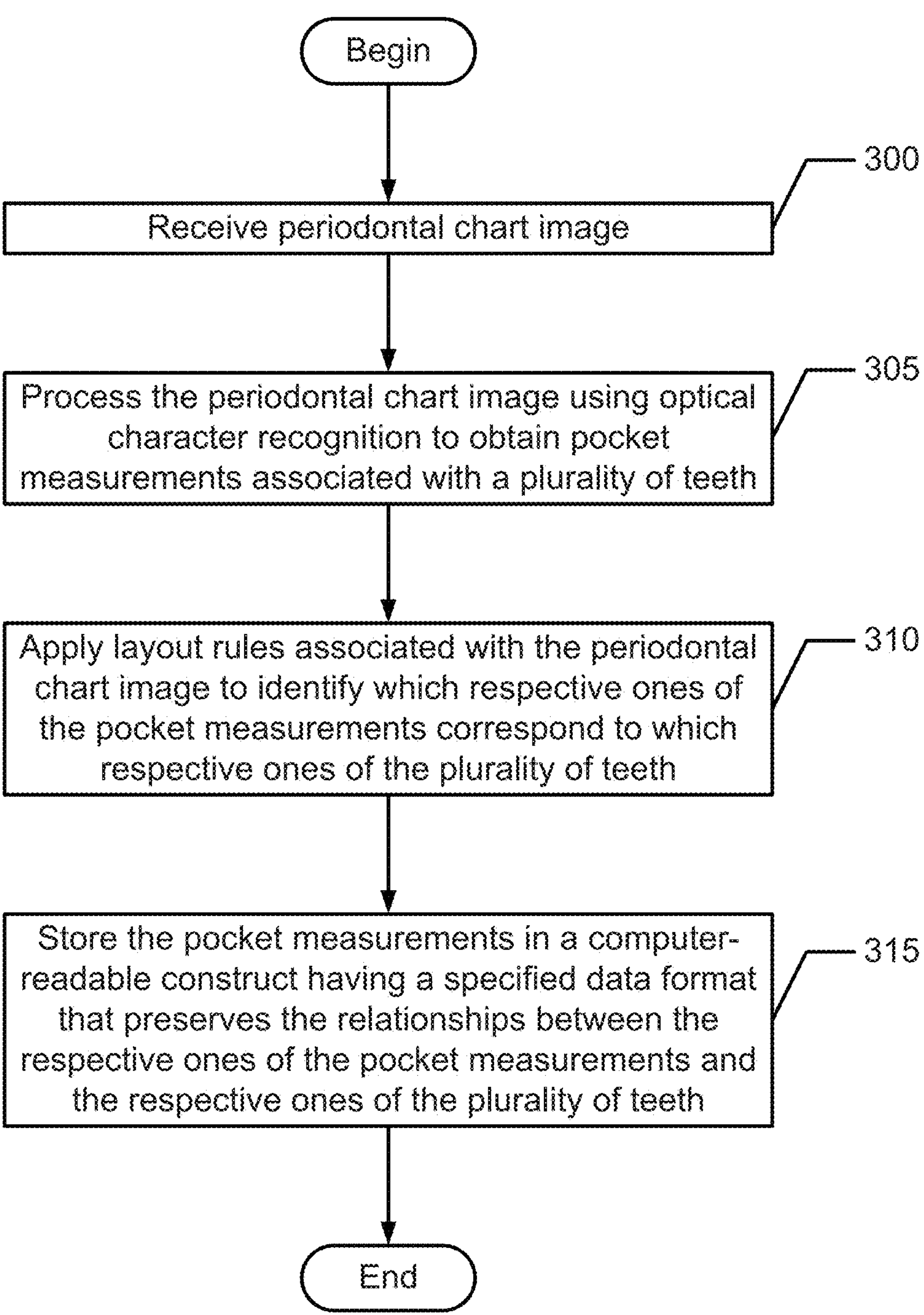
FIGS. 3 and 4 are flowcharts that illustrate operations of the periodontal chart processing system in accordance with some embodiments of the inventive concept.
Figure 4:
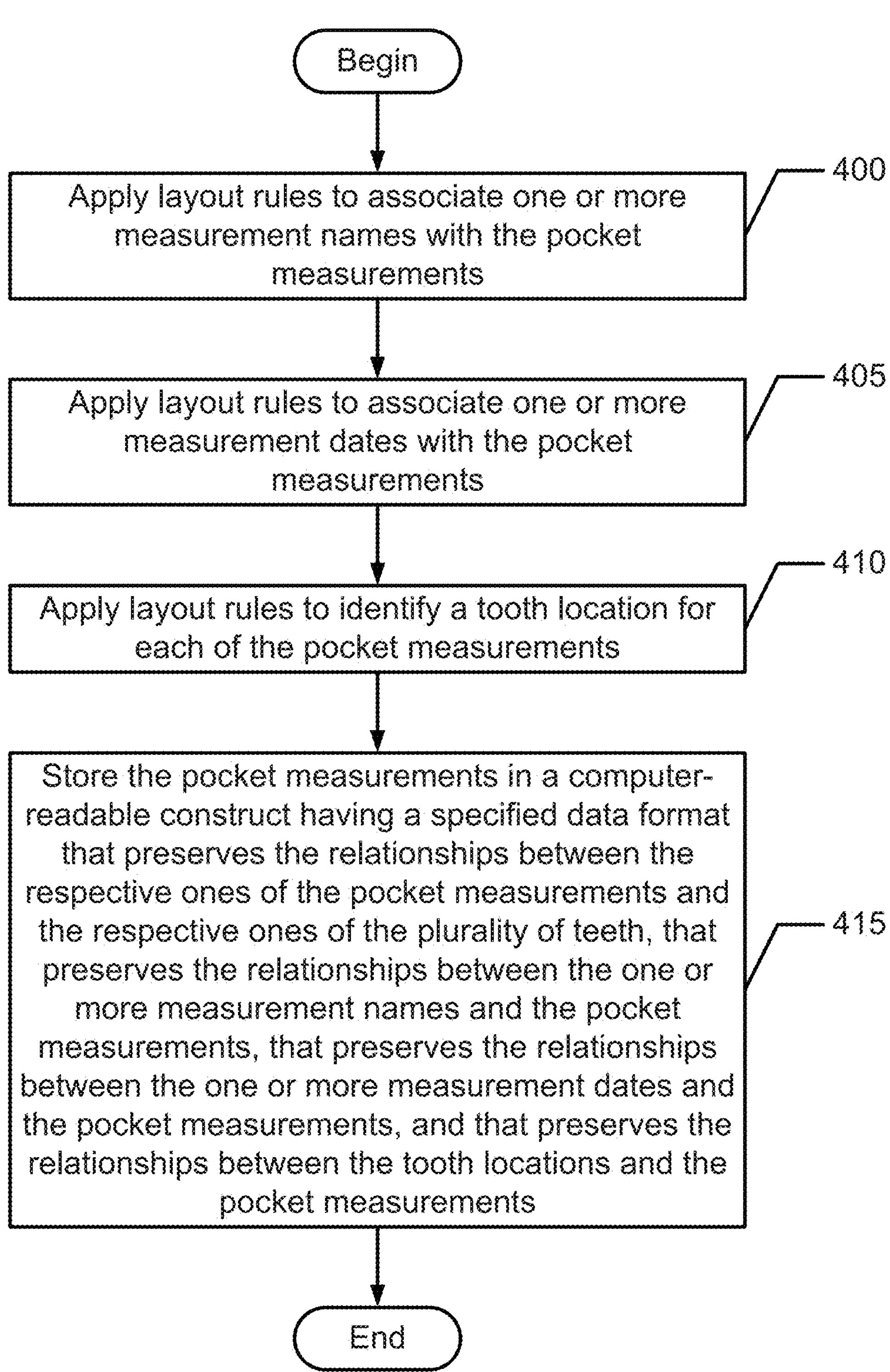

FIGS. 3 and 4 are flowcharts that illustrate operations of the periodontal chart processing system in accordance with some embodiments of the inventive concept. Referring now to FIG. 3, operations begin at block 300 where a periodontal chart image is received. The periodontal chart image is processed using OCR to obtain pocket measurements associated with a plurality of teeth at block 305. Layout rules associated with the periodontal chart image are applied at block 310 to identify which respective ones of the pocket measurements correspond to which respective ones of the plurality of teeth. At block 315, the pocket measurements are stored in a computer-readable construct having a specified data format that preserves the relationships between the respective ones of the pocket measurements and the respective ones of the plurality of teeth. As described above, a periodontal chart may include additional information, such as, but not limited to, measurement names, measurement dates, tooth location (facial, lingual, or buccal) and the like, which may also be associated with the respective teeth and respective pocket measurements. Thus, referring to FIG. 4, operations begin at block 400 where the layout rules are applied to associate one or more measurement names with the pocket measurements. At block 405, the layout rules are applied to associate one or more measurement dates with the pocket measurements. And at block 410, the layout rules are applied to identify a tooth location for each of the pocket measurements. The pocket measurements may then be stored in a computer readable construct having a specified data format at block 415 that preserves the relationships between the respective ones of the pocket measurements and the respective ones of the plurality of teeth, that preserves the relationships between the one or more measurement names and the pocket measurements, that preserves the relationships between the one or more measurement dates and the pocket measurements, and that preserves the relationships between the tooth locations and the pocket measurements.

Figure 6:
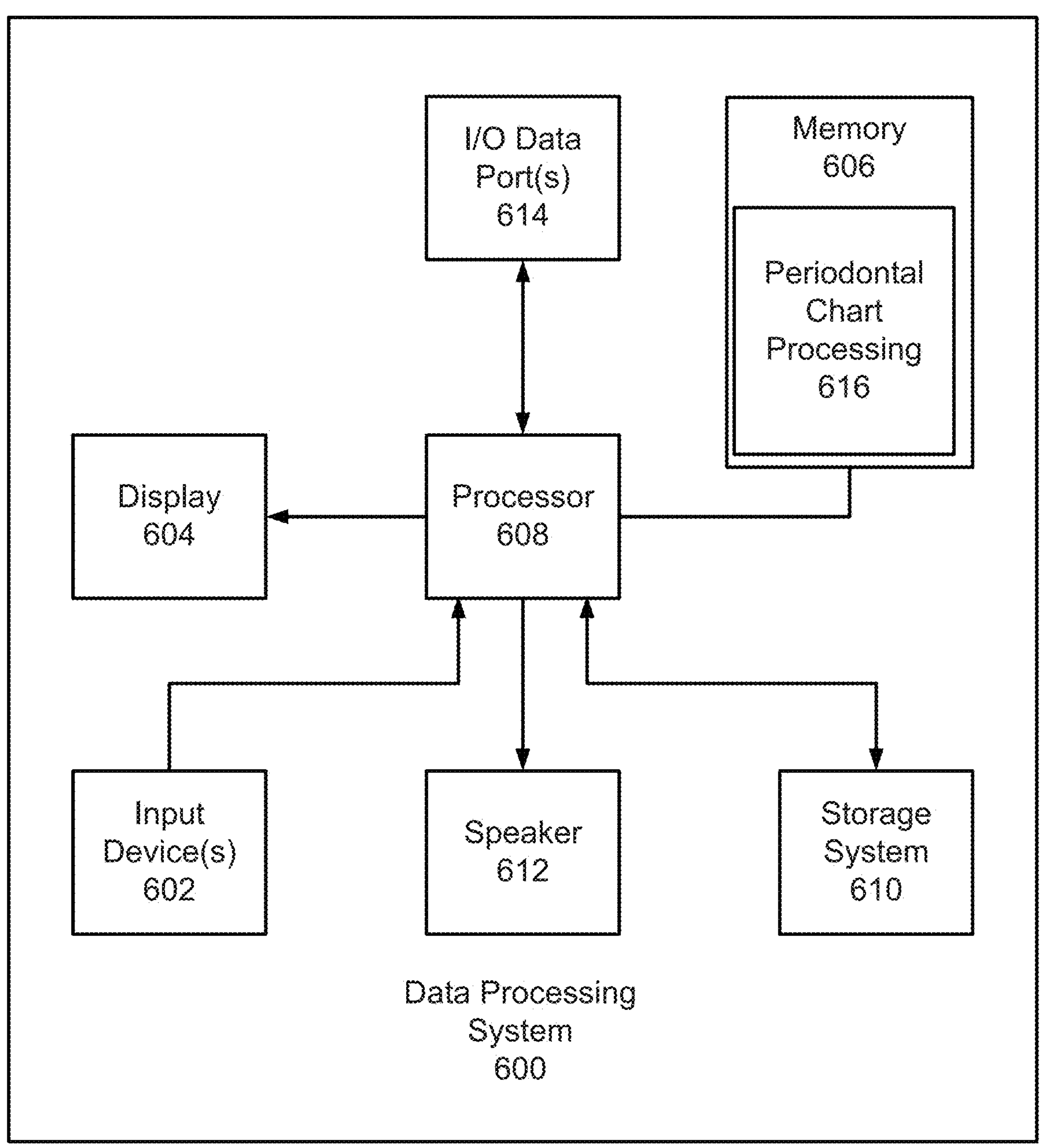
FIG. 6 is a data processing system that may be used to implement periodontal chart processing system in accordance with some embodiments of the inventive concept.

Referring now to FIG. 6, a data processing system 600 that may be used to implement the periodontal chart processing system server 104 of FIG. 1, in accordance with some embodiments of the inventive concept, comprises input device(s) 602, such as a keyboard or keypad, a display 604, and a memory 606 that communicate with a processor 608. The data processing system 600 may further include a storage system 610, a speaker 612, and an input/output (I/O) data port(s) 614 that also communicate with the processor 608. The storage system 610 may include removable and/or fixed media, such as floppy disks, ZIP drives, hard disks, or the like, as well as virtual storage, such as a RAMDISK. The I/O data port(s) 614 may be used to transfer information between the data processing system 600 and another computer system or a network (e.g., the Internet). These components may be conventional components, such as those used in many conventional computing devices, and their functionality, with respect to conventional operations, is generally known to those skilled in the art. The memory 606 may be configured with a periodontal chart processing module 616 that may provide functionality that may include, but is not limited to, processing a periodontal chart to store the information items therein in a construct that preserves the relationships between the information items.

Figure 7:
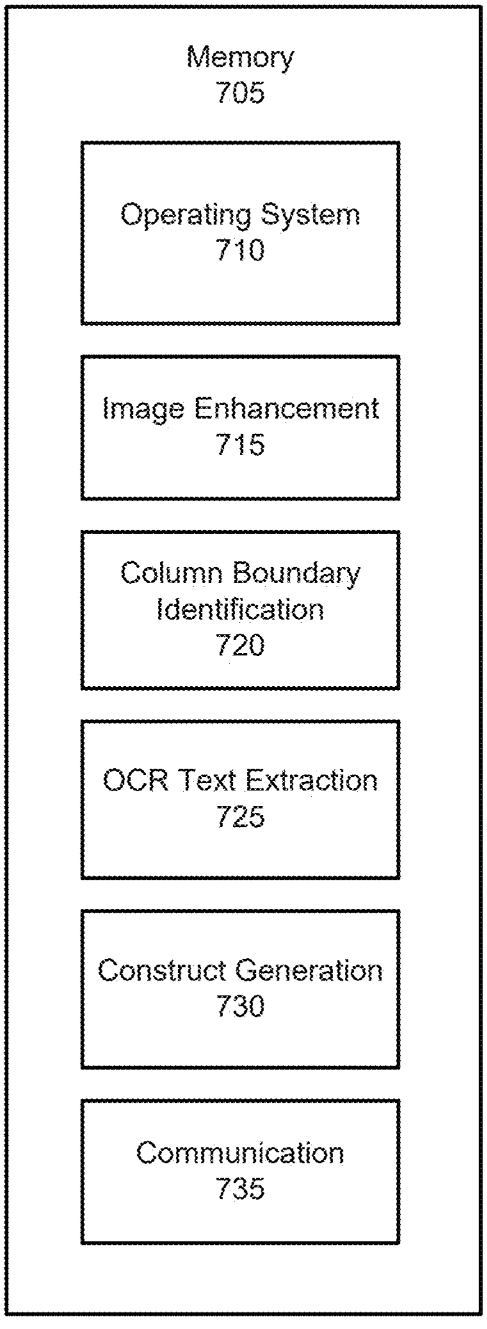
FIG. 7 is a block diagram that illustrates a software/hardware architecture for use in in a periodontal chart processing system in accordance with some embodiments of the inventive concept.

FIG. 7 illustrates a memory 705 that may be used in embodiments of data processing systems, such as the periodontal chart processing system server 104 of FIG. 1 and the data processing system of FIG. 6, respectively, to facilitate processing a periodontal chart to store the information items therein in a construct that preserves the relationships between the information items. The memory 705 is representative of the one or more memory devices containing the software and data used for facilitating operations of the periodontal chart processing system server 104, the periodontal chart processing module 135, and the periodontal chart processing module 616 as described herein. The memory 705 may include, but is not limited to, the following types of devices: cache, ROM, PROM, EPROM, EEPROM, flash, SRAM, and DRAM. As shown in FIG. 7, the memory 705 may contain six or more categories of software and/or data: an operating system 710, an image enhancement module 715, a column boundary identification module 720, an OCR text extraction module 725, a construct generation module 730, and a communication module 740.

In particular, the operating system 710 may manage the data processing system's software and/or hardware resources and may coordinate execution of programs by the processor. The image enhancement module 715 may be configured to perform one or more operations described above with respect to the image enhancement module 205 of FIG. 2 and the flowcharts of FIGS. 3 and 4. The column boundary identification module 720 may be configured to perform one or more operations described above with respect to the column boundary identification module 210 of FIG. 2 and the flowcharts of FIGS. 3 and 4. The OCR text extraction module 725 may be configured to perform one or more operations described above with respect to the OCR text extraction module 225 of FIG. 2 and the flowcharts of FIGS. 3 and 4. The construct generation module 730 may be configured to perform one or more operations described above with respect to the construct generation module 230 of FIG. 2 and the flowcharts of FIGS. 3 and 4. The communication module 735 may be configured to facilitate communication between the periodontal chart processing system server 104 and an entity, such as a dental care provider and/or payor.

Although FIG. 7 illustrates hardware/software architectures that may be used in data processing systems, such as the periodontal chart processing system server 104 of FIG. 1 and the data processing system of FIG. 6, respectively, in accordance with some embodiments of the inventive concept, it will be understood that embodiments of the present invention are not limited to such a configuration but is intended to encompass any configuration capable of carrying out operations described herein.

Computer program code for carrying out operations of data processing systems discussed above with respect to FIGS. 1-7 may be written in a high-level programming language, such as Python, Java, C, and/or C++, for development convenience. In addition, computer program code for carrying out operations of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

Moreover, the functionality of the periodontal chart processing system server 104 and the data processing system 600 of FIG. 6 may each be implemented as a single processor system, a multi-processor system, a multi-core processor system, or even a network of stand-alone computer systems, in accordance with various embodiments of the inventive concept. Each of these processor/computer systems may be referred to as a "processor" or "data processing system." The functionality provided by the periodontal chart processing system server 104 may be embodied as a single server or embodied as separate servers in accordance with different embodiments of the inventive concept.

The data processing apparatus described herein with respect to FIGS. 1-6 may be used to facilitate processing a periodontal chart to store the information items therein in a construct that preserves the relationships between the information items according to some embodiments of the inventive concept described herein. These apparatus may be embodied as one or more enterprise, application, personal, pervasive and/or embedded computer systems and/or apparatus that are operable to receive, transmit, process and store data using any suitable combination of software, firmware and/or hardware and that may be standalone or interconnected by any public and/or private, real and/or virtual, wired and/or wireless network including all or a portion of the global communication network known as the Internet, and may include various types of tangible, non-transitory computer readable media. In particular, the memory 606 and memory 705 when coupled to a processor includes computer readable program code that, when executed by the processor, causes the processor to perform operations including one or more of the operations described herein with respect to FIGS. 1-5.

Some embodiments of the inventive concept may provide a periodontal chart processing system that can extract the teeth and pocket measurement information contained therein and store this information in a computer-readable construct having a specified data format that preserves the relationships between the pocket measurements and the teeth. This computer-readable construct may then be processed by a computer to automate the manual review of periodontal chart information during claim adjudication by a payor. This may improve the efficiency and accuracy of the claim adjudication process and, as a result, reduce costs for a payor.

Further Definitions and Embodiments

In the above-description of various embodiments of the present inventive concept, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

The flowchart and block diagrams in the figures illustrate the architecture, functionality, and operation of possible implementations of systems, methods, and computer program products according to various aspects of the present inventive concept. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

In the above-description of various embodiments of the present inventive concept, aspects of the present inventive concept may be illustrated and described herein in any of a number of patentable classes or contexts including any new and useful process, machine, manufacture, or composition of matter, or any new and useful improvement thereof. Accordingly, aspects of the present inventive concept may be implemented entirely hardware, entirely software (including firmware, resident software, micro-code, etc.) or combining software and hardware implementation that may all generally be referred to herein as a "circuit," "module," "component," or "system." Furthermore, aspects of the present inventive concept may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

The description of the present inventive concept has been presented for purposes of illustration and description, but is not intended to be exhaustive or limited to the inventive concept in the form disclosed. Many modifications and variations will be apparent to those of ordinary skill in the art without departing from the scope and spirit of the inventive concept. The aspects of the inventive concept herein were chosen and described to best explain the principles of the inventive concept and the practical application, and to enable others of ordinary skill in the art to understand the inventive concept with various modifications as are suited to the particular use contemplated.

What is claimed is:

1. A method, comprising:

receiving, by one or more processors, a periodontal chart image with columns wherein each column is associated with a unique set of teeth, and the periodontal chart image includes column boundaries including:

at least one column boundary undefined by column separator indicia and which is derivable using optical character recognition, and rows corresponding to measurement names;

processing, by the one or more processors, the periodontal chart image using optical character recognition to obtain pocket measurements associated with a plurality of teeth along with positional coordinates of each of the pocket measurements;

applying, by the one or more processors, layout rules associated with the periodontal chart image to identify which respective ones of the pocket measurements correspond to which respective ones of the plurality of teeth;

converting, by the one or more processors, the pocket measurements on the periodontal chart image into a specified data format that includes a tooth location and tooth number; and storing, by the one or more processors, the pocket measurements in a computer-readable construct having the specified data format that preserves relationships between the respective ones of the pocket measurements and the respective one of the plurality of teeth.

2. The method of claim 1, further comprising:

applying, by the one or more processors, layout rules associated with the periodontal chart image to associate one or more measurement names with the pocket measurements;

applying, by the one or more processors, layout rules associated with the periodontal chart image to associate one or more measurement dates with the pocket measurements; and applying, by the one or more processors, layout rules associated with the periodontal chart image to identify a tooth location for each of the pocket measurements;

wherein storing the pocket measurements comprises:

storing, by the one or more processors, the pocket measurements in the computer-readable construct having the specified data format that preserves the relationships between the respective ones of the pocket measurements and the respective one of the plurality of teeth, that preserves relationships between the one or more measurement names and the pocket measurements, that preserves relationships between the one or more measurement dates and the pocket measurements, and that preserves relationships between the tooth locations and the pocket measurements.

3. The method of claim 2, wherein the tooth location is facial, lingual, or buccal.

4. The method of claim 3, wherein the layout rules specify that row coordinates are used to differentiate the pocket measurements for different ones of the plurality of teeth;

wherein the layout rules specify that the one or more measurement names have similar column coordinates;

wherein the layout rules specify that the one or more measurement dates have similar column coordinates; and wherein the layout rules specify that ones of the pocket measurements corresponding to a same one of the plurality of teeth have similar column coordinates.

5. The method of claim 4, wherein the layout rules specify that ones of the pocket measurements corresponding to teeth 1-16 in the facial location are in a first quarter section of the periodontal chart image as defined by column coordinates;

wherein the layout rules specify that ones of the pocket measurements corresponding to teeth 1-16 in the lingual location are in a second quarter section of the periodontal chart image as defined by column coordinates;

wherein the layout rules specify that ones of the pocket measurements corresponding to teeth 32-17 in the lingual location are in a third quarter section of the periodontal chart image as defined by column coordinates; and wherein the layout rules specify that ones of the pocket measurements corresponding to teeth 32-17 in the facial location are in a fourth quarter section of the periodontal chart image as defined by column coordinates.

6. The method of claim 1, further comprising:

enhancing, by the one or more processors, the periodontal chart image prior to processing the periodontal chart image using optical character recognition.

7. The method of claim 6, wherein enhancing the periodontal chart image comprises:

removing, by the one or more processors, extraneous information from the periodontal chart image;

normalizing, by the one or more processors, the background of the periodontal chart image;

changing, by the one or more processors, one or more font colors used in the periodontal chart image; or changing, by the one or more processors, one or more font sizes used in the periodontal chart image.

8. The method of claim 1, further comprising:

identifying, by the one or more processors, the column boundaries in the periodontal chart image;

wherein identifying the column boundaries in the periodontal chart image comprises:

identifying, by the one or more processors, the column boundaries in the periodontal chart image using image segmentation when the periodontal chart image includes column separator indicia; and deriving, by the one or more processors, the column boundaries using optical character recognition coordinates when the periodontal chart images does not include column separator indicia.

9. The method of claim 1, wherein the computer-readable construct having the specified data format is a JavaScript Object Notation (JSON) string.

10. A system, comprising:

one or more processors; and one or more memories storing processor-executable instructions that, when executed by the one or more processors, cause the one or more processors to perform operations comprising:

receiving a periodontal chart image with columns wherein each column is associated with a unique set of teeth, and the periodontal chart image includes column boundaries including:

at least one column boundary undefined by column separator indicia and which is derivable using optical character recognition, and rows corresponding to measurement names;

processing the periodontal chart image using optical character recognition to obtain pocket measurements associated with a plurality of teeth along with positional coordinates of each of the pocket measurements;

applying layout rules associated with the periodontal chart image to identify which respective ones of the pocket measurements correspond to which respective ones of the plurality of teeth;

converting the pocket measurements on the periodontal chart image into a specified data format that includes a tooth location and tooth number; and storing the pocket measurements in a computer-readable construct having the specified data format that preserves relationships between the respective ones of the pocket measurements and the respective one of the plurality of teeth.

11. The system of claim 10, wherein the operations further comprise:

applying layout rules associated with the periodontal chart image to associate one or more measurement names with the pocket measurements;

applying layout rules associated with the periodontal chart image to associate one or more measurement dates with the pocket measurements; and applying layout rules associated with the periodontal chart image to identify a tooth location for each of the pocket measurements;

wherein storing the pocket measurements comprises:

storing the pocket measurements in the computer-readable construct having the specified data format that preserves the relationships between the respective ones of the pocket measurements and the respective one of the plurality of teeth, that preserves relationships between the one or more measurement names and the pocket measurements, that preserves relationships between the one or more measurement dates and the pocket measurements, and that preserves relationships between the tooth locations and the pocket measurements; and wherein the tooth location is facial, lingual, or buccal.

12. The system of claim 11, wherein the layout rules specify that row coordinates are used to differentiate the pocket measurements for different ones of the plurality of teeth;

wherein the layout rules specify that the one or more measurement names have similar column coordinates;

wherein the layout rules specify that the one or more measurement dates have similar column coordinates; and wherein the layout rules specify that ones of the pocket measurements corresponding to a same one of the plurality of teeth have similar column coordinates.

13. The system of claim 12, wherein the layout rules specify that ones of the pocket measurements corresponding to teeth 1-16 in the facial location are in a first quarter section of the periodontal chart image as defined by column coordinates;

wherein the layout rules specify that ones of the pocket measurements corresponding to teeth 1-16 in the lingual location are in a second quarter section of the periodontal chart image as defined by column coordinates;

wherein the layout rules specify that ones of the pocket measurements corresponding to teeth 32-17 in the lingual location are in a third quarter section of the periodontal chart image as defined by column coordinates; and wherein the layout rules specify that ones of the pocket measurements corresponding to teeth 32-17 in the facial location are in a fourth quarter section of the periodontal chart image as defined by column coordinates.

14. The system of claim 10, wherein the operations further comprise:

enhancing the periodontal chart image prior to processing the periodontal chart image using optical character recognition;

wherein enhancing the periodontal chart image comprises:

removing extraneous information from the periodontal chart image;

normalizing the background of the periodontal chart image;

changing one or more font colors used in the periodontal chart image; or changing one or more font sizes used in the periodontal chart image.

15. The system of claim 10, wherein the operations further comprise:

identifying the column boundaries in the periodontal chart image;

wherein identifying the column boundaries in the periodontal chart image comprises:

identifying the column boundaries in the periodontal chart image using image segmentation when the periodontal chart image includes column separator indicia; and deriving the column boundaries using optical character recognition coordinates when the periodontal chart images does not include column separator indicia.

16. One or more non-transitory computer-readable media storing processor-executable instructions that, when executed by one or more processors, cause the one or more processors to perform operations comprising:

receiving a periodontal chart image with columns wherein each column is associated with a unique set of teeth, and the periodontal chart image includes column boundaries including:

at least one column boundary undefined by column separator indicia and which is derivable using optical character recognition, and rows corresponding to measurement names;

processing the periodontal chart image using optical character recognition to obtain pocket measurements associated with a plurality of teeth along with positional coordinates of each of the pocket measurements;

applying layout rules associated with the periodontal chart image to identify which respective ones of the pocket measurements correspond to which respective ones of the plurality of teeth;

converting the pocket measurements on the periodontal chart image into a specified data format that includes a tooth location and tooth number; and storing the pocket measurements in a computer-readable construct having the specified data format that preserves relationships between the respective ones of the pocket measurements and the respective one of the plurality of teeth.

17. The one or more non-transitory computer-readable media of claim 16, wherein the operations further comprise:

applying layout rules associated with the periodontal chart image to associate one or more measurement names with the pocket measurements;

applying layout rules associated with the periodontal chart image to associate one or more measurement dates with the pocket measurements; and applying layout rules associated with the periodontal chart image to identify a tooth location for each of the pocket measurements;

wherein storing the pocket measurements comprises:

storing the pocket measurements in the computer-readable construct having the specified data format that preserves the relationships between the respective ones of the pocket measurements and the respective one of the plurality of teeth, that preserves relationships between the one or more measurement names and the pocket measurements, that preserves relationships between the one or more measurement dates and the pocket measurements, and that preserves relationships between the tooth locations and the pocket measurements; and wherein the tooth location is facial, lingual, or buccal.

18. The one or more non-transitory computer-readable media of claim 17, wherein the layout rules specify that row coordinates are used to differentiate the pocket measurements for different ones of the plurality of teeth;

wherein the layout rules specify that the one or more measurement names have similar column coordinates;

wherein the layout rules specify that the one or more measurement dates have similar column coordinates;

wherein the layout rules specify that ones of the pocket measurements corresponding to a same one of the plurality of teeth have similar column coordinates;

wherein the layout rules specify that ones of the pocket measurements corresponding to teeth 1-16 in the facial location are in a first quarter section of the periodontal chart image as defined by column coordinates;

wherein the layout rules specify that ones of the pocket measurements corresponding to teeth 1-16 in the lingual location are in a second quarter section of the periodontal chart image as defined by column coordinates;

wherein the layout rules specify that ones of the pocket measurements corresponding to teeth 32-17 in the lingual location are in a third quarter section of the periodontal chart image as defined by column coordinates; and wherein the layout rules specify that ones of the pocket measurements corresponding to teeth 32-17 in the facial location are in a fourth quarter section of the periodontal chart image as defined by column coordinates.

19. The one or more non-transitory computer-readable media of claim 16, wherein the operations further comprise:

enhancing the periodontal chart image prior to processing the periodontal chart image using optical character recognition;

wherein enhancing the periodontal chart image comprises:

removing extraneous information from the periodontal chart image;

normalizing the background of the periodontal chart image;

changing one or more font colors used in the periodontal chart image; or changing one or more font sizes used in the periodontal chart image.

20. The one or more non-transitory computer-readable media of claim 16, wherein the operations further comprise:

identifying the column boundaries in the periodontal chart image;

wherein identifying the column boundaries in the periodontal chart image comprises:

identifying the column boundaries in the periodontal chart image using image segmentation when the periodontal chart image includes column separator indicia; and deriving the column boundaries using optical character recognition coordinates when the periodontal chart images does not include column separator indicia.

* * * * *